United States Patent [19]

Kenney

[11] 3,839,766
[45] Oct. 8, 1974

[54] CONVEYOR BELTS
[75] Inventor: Michael John Kenney, Sutton Coldfield, England
[73] Assignee: Dunlop Limited, London, England
[22] Filed: June 2, 1972
[21] Appl. No.: 259,153

[30] Foreign Application Priority Data
June 2, 1971    Great Britain .................... 18604/71
Mar. 1, 1972    Great Britain .................... 09441/72

[52] U.S. Cl. .................... 24/31 W, 24/31 L, 24/37, 74/231 J
[51] Int. Cl. ............................................. F16g 3/00
[58] Field of Search ..... 24/31 R, 31 B, 31 H, 31 W, 24/31 C, 31 L, 37, 33, 33 A, 33 V; 74/231 J

[56] References Cited
UNITED STATES PATENTS

| | | | |
|---|---|---|---|
| 9,080 | 6/1852 | Smith | 24/37 |
| 2,265,604 | 12/1941 | Knoedler | 24/31 C |
| 2,318,287 | 5/1943 | Brolin | 74/231 J |
| 2,449,950 | 9/1948 | Nassimbene | 24/31 W |
| 3,105,390 | 10/1963 | Funke et al. | 24/31 W |
| 3,327,359 | 6/1967 | Wiese | 24/31 W |
| 3,701,432 | 10/1972 | Schlegel | 24/31 B |

Primary Examiner—Paul R. Gilliam
Assistant Examiner—Kenneth J. Dorner
Attorney, Agent, or Firm—Stevens, Davis, Miller & Mosher

[57] ABSTRACT

A belt coupling means comprises first abutment means securable to one end of a belt, second abutment means securable to another belt end, these abutment means consisting of one or more abutment elements, the abutment elements of the first abutment means being arranged so as to be engageable with the abutment elements of the second abutment means, and a clamping bar engageable with the first and second abutment means, to hold them together. This coupling means presents a quick and relatively inexpensive method by which wire or fabric reinforced belts may be joined, with little detrimental effect on the overall strength of the belt, of which the following is a Specification.

9 Claims, 12 Drawing Figures

PATENTED OCT 8 1974

CONVEYOR BELTS

The present invention relates to conveyor belts and in particular coupling means for conveyor belts.

Conveyor belts are usually made as long lengths of belt the ends of which are usually joined together on site to make a continuous band. Hitherto two methods have generally been used to join conveyor belts these being:

1. to staple fasteners through the reinforced carcass at the ends to be joined, the fasteners being held together by a metal pin or rod, or
2. the ends of the belt are delaminated to expose the reinforcing elements of the carcass which are then splice joined and the belt revulcanized to form a strong invisible joint.

Although these methods both give good results they both suffer from certain defects, for instance the staple joint, although very quick and inexpensive to fit requiring a minimum of skill, possesses only a fraction of the strength of the reinforced carcasses to which it is attached and because of this it is necessary to increase the strength of the carcass of the whole belt to achieve the required strength for the joint. Also this type of joint cannot be used where it is important to have a continuous surface on the belt.

The method of splicing the joint and remoulding the surface produces and excellent joint that can be made as strong as the belt carcass and can be made with a continuous surface. However, this method requires a considerable amount of manual skill, heavy vulcanizing equipment and a considerable amount of time to complete. This is not so bad if the joint is to be made in the manufacturing factory, however the joints made on site this method becomes extremely expensive.

According to one aspect of the present invention a belt coupling means comprises first abutment means secured or adapted to be secured to one end of the belt, second abutment means secured or adapted to be secured to the other end of the belt or to an end of another belt, these abutment means consisting of one or more abutment elements, the abutment elements of the first abutment means being arranged so as to be engageable with the abutment elements of the second abutment means, and a clamping bar engageable with the first and second abutment means, to hold them together.

According to a further aspect of the present invention a belt comprises the belt carcass to each end of which is securely attached abutment means, said abutment means consisting of one or more abutment elements positioned and shaped so that the abutment means at one end of the belt is engageable with a corresponding abutment means at the other end of the belt or at the end of another belt and being clamped thereto by means of a clamping bar.

The coupling means of this invention may be suitable for belts having a multi-fabric construction or wire reinforced belts.

The abutment elements may be secured or adapted to be secured to the end of each belt by at least one connecting element. The connecting elements attached to the ends of each belt may be extensions of the reinforcing elements of the belt carcass or may be separate wires or fabric plies which are firmly secured to the belt carcass by conventional splicing techniques.

The clamping bar used to clamp the abutment elements together usually comprises two bars which clamp together with screws or other fastening means which pass through holes in the abutment elements.

When the coupling device is to be used with wire reinforced belts the abutment elements are preferably in the form of nipples attached individually to each connecting element, however if desired the nipples may be attached to more than one connecting element. These nipples may be secured to the connecting elements by any suitable means however in order to obtain the maximum strength for the joint it is preferred to swage the nipples onto the connecting elements.

These abutment elements are preferably arranged so that those connected to one belt end may be intermeshed wwith those attached to the corresponding belt end so that the abutment elements attached to each belt end fall between the abutment elements attached to the other belt end and the other belt and thereby forming a joint.

In order to eliminate the tendency of the nipples to move out of mesh when the joint is put into tension and thus reduce the load put on the clamping screws, the ends of the nipples may be shaped so that they will interlock with one another. Thus the abutting surfaces of the abutment elements may have interlocking configurations which will under tension retain the abutment elements in position or even tend to force the abutment elements together, for example the abutting surfaces may be "V" and wedge shaped, cylindrically concave and convex or may have simple locating lugs.

For ease of production especially when the abutting surfaces of the abutment elements are shaped these abutment elements may be in the form of shaped collars which are retained in position on the connecting elements by means of swaged nipples. These nipples may either abut with the ends of the shaped collars or may be recessed into the shaped collar.

When the coupling device is to be used with fabric ply reinforced belts the abutment elements may be the surfaces of the connecting elements; however, it is preferred to bond thin strips of metal to these surfaces. The holes in these abutment elements are made a close fit for the fastening means so that additional strength is obtained.

The overall thickness of the joint may be reduced by removing the weft threds from the connecting elements in the area to which the metal strips are bonded.

Additional strength may be obtained by arranging the warp threads on either side of the holes provided for the fastening means instead of cutting them.

If it is not intended to dismantle the joint once it has been made, additional strength may be obtained by bonding the abutment elements before clamping. Alternatively, the strength of the joint may be enhanced by applying thin films, having high coefficients of friction, to the abutment elements, for example, films of rubber or fine abrasive material.

The strength of the joint may also be increased by providing flanges on the abutment elements, these flanges arranged so that those associated with the abutment elements attached to one end of the belt intermesh with the flanges associated with the abutment elements attached to the other belt end.

Alternatively the abutment elements may be in the form of bars which are connected to the belt carcass by connecting elements passing through slots in the bars, both ends of the connecting elements being secured in the belt carcasses. In one convenient form, one of the bars may be U-shaped, the connecting elements passing through slots in the curved section of the U and round a bar cradled in the curved section. A single bar connected to one belt end may be inserted between the arms of the U-shaped bar and clamped in place as described above.

If desired, the clamping bar may be included as an integral part of the joint, by bonding the two bars to the connecting elements.

The clamping bar may be positioned flush with the surface of the belt and where a continuous surface is required the outer surface of the clamping bar may be of the desired shape i.e., ribbed, alternatively the coupling bar may be recessed below the surface of the belt so that it may be covered by an insert of the belting material.

In order to prevent ingress of dirt, water or other corrosive material into the joint clamping bars are preferably sealed in some way to the belt carcass, this may be done for example by bonding the clamping bar and belt carcasses, shaping the clamping bar so it clamps in the ends of the belt forming the seal, bonding end plates to the carcass and fitting the clamping bars accurately between the end plates or by insetting the clamping bar and bonding inserts of the belting material over them so as to form a continuous surface.

The coupling devices of this invention may be made integral with the belt carcasses or may be prefabricated, in either case, but preferably when the coupling device is prefabricated connecting elements may be spaced by blocks which are bonded between the elements, it is usual to use blocks of the material used for the belts to which the coupling device is to be attached, for this purpose.

The coupling devices disclosed so far are ideally suitable for use with transversely rigid belts as the clamping bars will normally be made of metal although other materials may be used.

The coupling devices may equally well be used with the belts that are transversely flexible provided the clamping bars are made flexible, this may be done by using clamping bars which are divided into segments connected or embedded in the flexible material for example rubber.

The invention will now be described with reference to the accompanying drawings in which.

Figure 1:
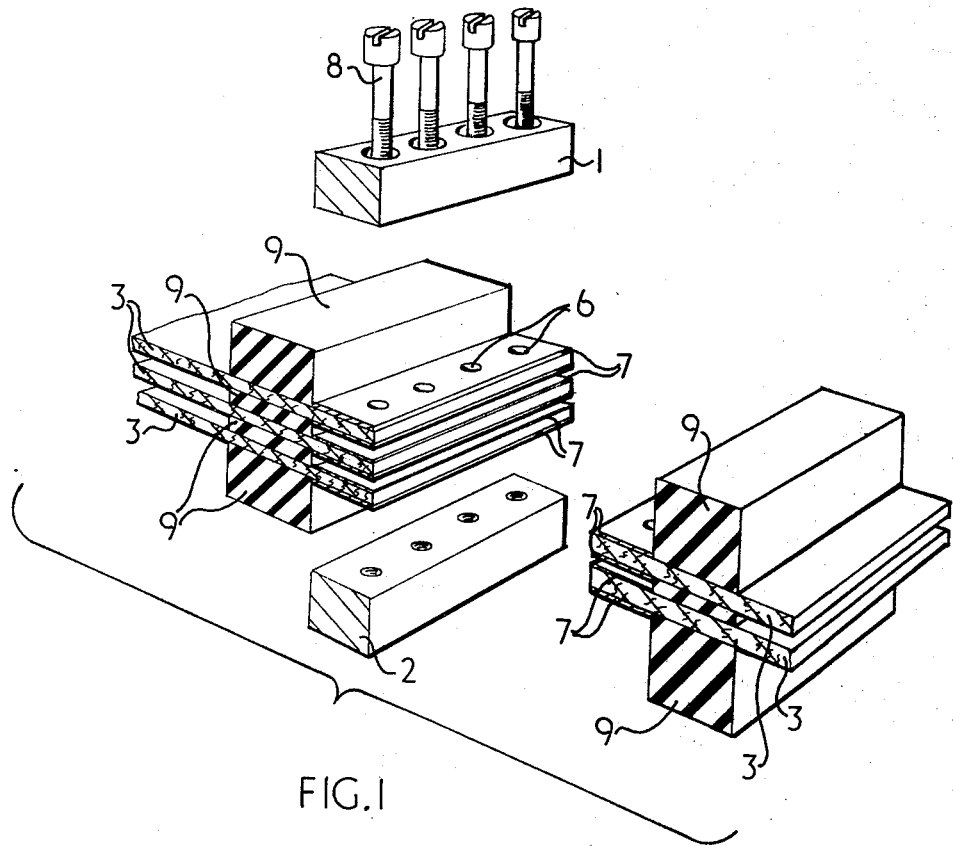
FIG. 1 shows an exploded view of one embodiment of the coupling device of this invention, suitable for use with fabric ply reinforced belts.
Figure 2:
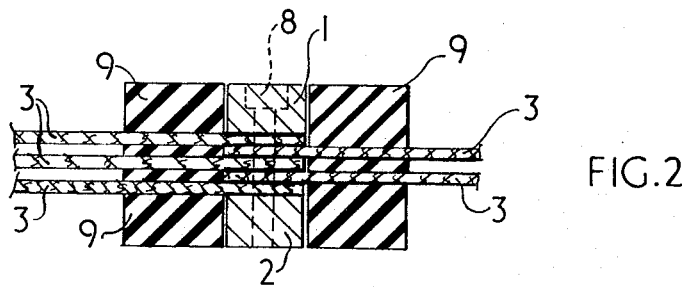
FIG. 2 shows a side elevation of the embodiment of the invention shown in FIG. 1; the coupling device being clamped together.

The coupling device shown in FIGS. 1 and 2 comprises two sets of connecting elements 3 to be fixed to the ends of two belt carcasses which are to be joined. Each set of connecting elements 3 are separated by means of the end blocks 9, which are made of the same material as the belt carcasses (not shown), to which the connecting elements are spliced. Thin strips of metal 7 are bonded to the surfaces of the connecting elements extending from the end block 9 to form abutment elements. These abutment elements have a plurality of holes 6 which correspond to holes in the bars 1 and 2 which form the clamping bar, through which screws 8 pass to clamp the two bars, and thus the joint, together.

Figure 3:
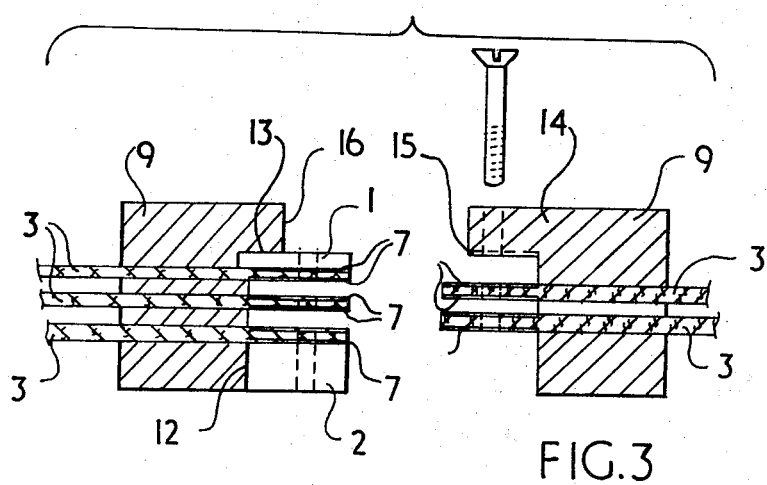
FIG. 3 shows the side elevation of another embodiemnt of the invention, with means for sealing the joint.

A method of preventing ingress of dirt or corrosive substances into the joint is shown in FIG. 3. Here the bars 1 and 2 are bonded to the outer connecting elements 3, and the belt ends at 12 and 13. The top surface of the joint is extended to form an additional tongue 14 extending over the bar 1 to butt up to the face 16, a thin metal strip 15 being bonded to this tongue 14. When the joint is assembled and clamped up tight the top surface of the joint remains sealed when the belt is flexed round a pulley or drum. The bottom surface may be similarly sealed if required.

Figure 4:
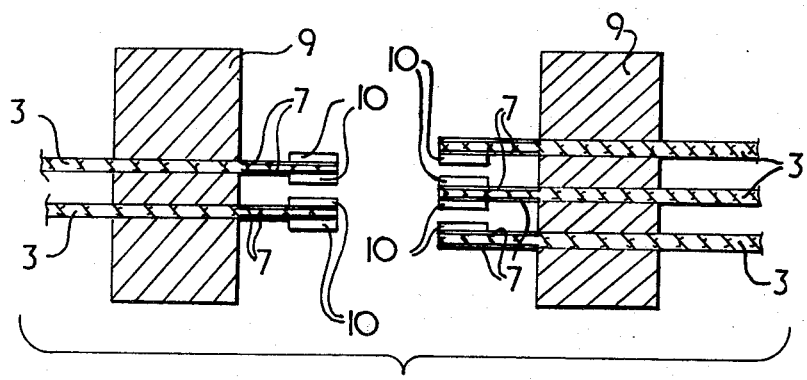
FIG. 4 shows an elevation of the abutment means of an improved version of the embodiment of the invention shown in FIG. 1.

FIG. 4 illustrates one method by which the strength of the joint may be increased. Strips of metal 10 are welded to the abutment elements 7 to form flanges which are positioned so that the flanges attached to the abutment elements associated with one belt intermesh with the flanges attached to the abutment elements associated with the other belt end, thereby reinforcing the strength of the joint and making it less dependent on the tightness of the clamping bar.

Figure 5:
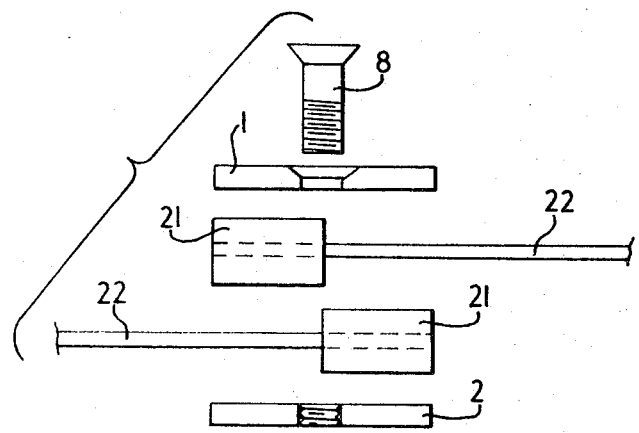
FIG. 5 shows an exploded view of an embodiment of the coupling device of this invention suitable for use with wire reinforced belts.
Figure 6:
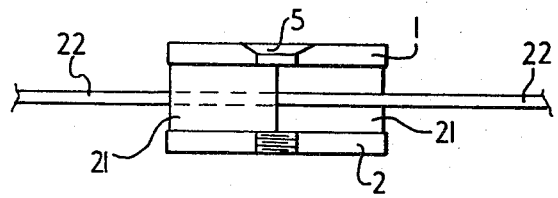
FIG. 6 shows a side elevation of the embodiment of the invention shown in FIG. 5, the coupling device being clamped together.
Figure 7:
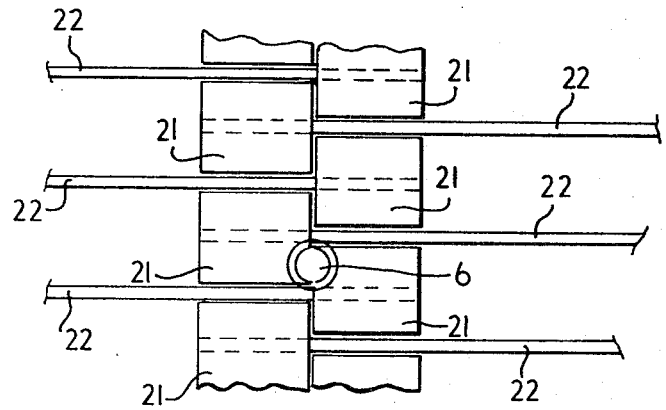
FIG. 7 shows a plan view of the embodiment of the invention shown in FIG. 5, without the clamping plates in position.

The coupling device shown in FIGS. 5, 6 and 7 comprises two sets of abutment elements comprising a plurality of nipples 21 these nipples being swaged onto reinforcing wires 22 which are extensions of the reinforcing elements of the belt carcasses to be joined (not shown) the nipples 21 are arranged so that the set attached to one of the belt carcasses may be intermeshed with the set attached to the other belt carcass as shown in FIG. 7, clamping bars 1 and 2 are then placed in contact with the intermeshing sets of nipples and are secured together by means of screws 8 which fit in holes 5 and pass through corresponding holes 6 in the nipples.

Figure 8:
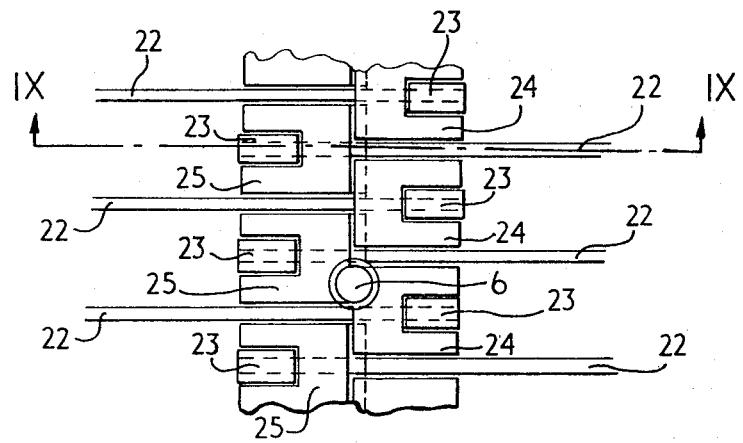
FIGS. 8 and 9 shows plan and part sectional elevational of an improved version of the embodiment of the coupling device shown in FIG. 5 in which the abutment elements are in the form of shaped collars.
Figure 9:
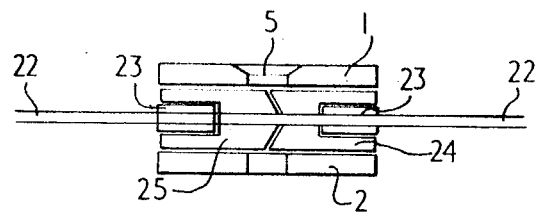

FIGS. 8 and 9 show another embodiment of the present invention in which the abutment elements are in the form of shaped collars 24 and 25 which are secured to reinforcing wires 22 by means of swaged nipples 23 which are recessed in the shaped collars, the coupling device is assembled in the same way as that embodiment shown in FIGS. 5, 6 and 7. The abutting surfaces of the collars 24 and 25 shown in this embodiment are "V" and wedge shaped respectively so that tension across the coupling will tend to force the collars together and thus eliminate the tendency of the collars to move out of mesh.

Figure 10:
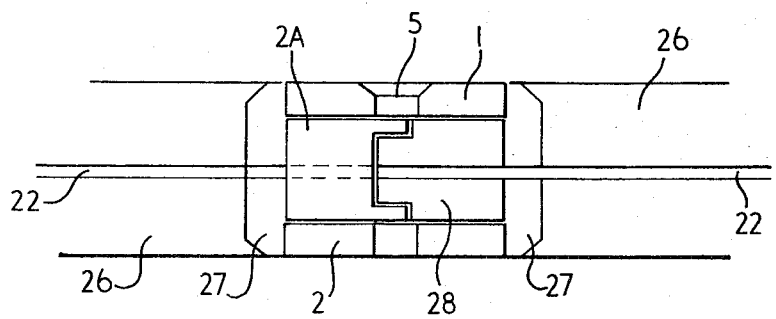
FIG. 10 shows a side elevation of an embodiment of the coupling device according to this invention in which means are provided for sealing the joint.

FIG. 10 shows one method by which the coupling device of the present invention may be sealed in order to prevent ingress of dust, water or other corrosive material, this method comprising bonding metal bars 27, having holes through which connecting elements 22 may pass, onto each end of the belt carcass 26 along its end face. The nipples are secured to the connecting wires 22 so that when they are intermeshed with each other they fit accurately between the two bars 27 thus preventing movement between clamping bars 1 and 2 and the bars 27 when the joint or the belt is flexed and thus effectively sealing the joint, against ingress foreign matter. The abutting surfaces of the nipples 28 and 29 shown in this embodiment of the invention have grooves and locating lugs respectively so that when tension is applied across the coupling the tendency of the nipples to move out of mesh will be eliminated.

Figure 11:
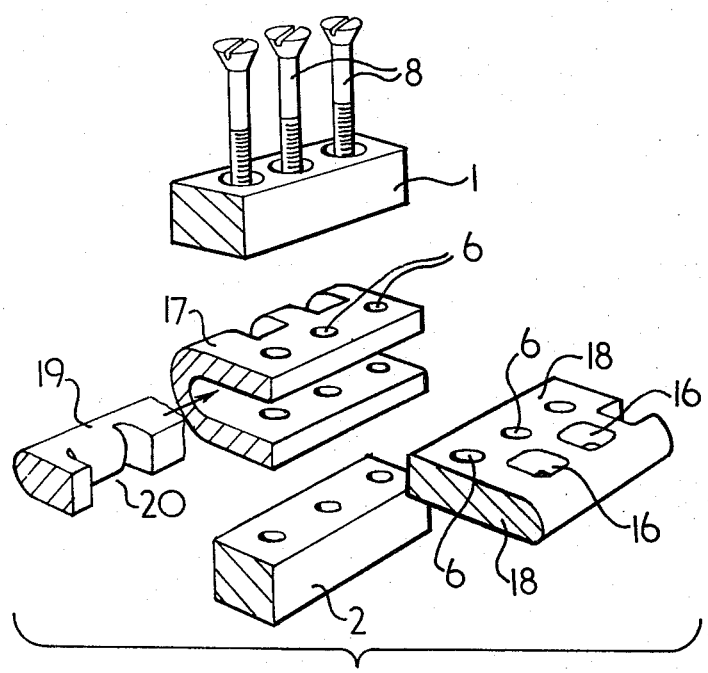
FIG. 11 shows an exploded view of a further embodiment of the present invention, suitable for use with fabric reinforced belts.
Figure 12:
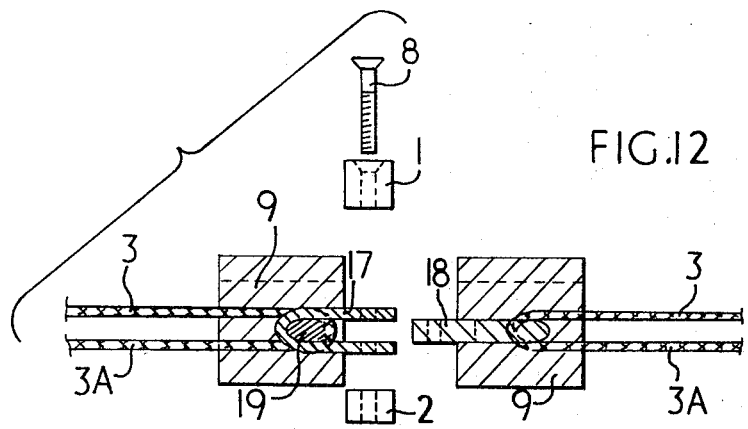
FIG. 12 shows a sectional elevation of the embodiment of the invention shown in FIG. 11 partially assembled.

The coupling device shown in FIGS. 11 and 12 comprises two sets of connecting elements 3 and 3A to be fixed to the ends of the belt carcass which is tO be joined. U-shaped bar 17 and bar 18 are attached to the connecting elements by passing the warp threads of 3 either round bar 20 or through slots 16, and returning them back as 3A. If the connecting element 3 is a conventional woven fabric the weft threads are removed to enable the warp threads to be passed round bar 19 or through slots 16, the return warp threads are then collected into a weftless ply 3A. In general it will be arranged that the combined tensile strength of the elements 3 and 3A will match the strength of the belt. The U-shaped bar 17 and bar 18 will usually be metal, the type and thickness being determined by the load and design features of the belt. To assemble the joint the bar 18 is inserted into the arms of the U-shaped bar and clamped up tight by means of the clamp bars 1 and 2 and the clamping screws 8 which pass through the holes 6. The U-shaped bar 17 and bar 18 are prevented from opening when the joint is under tension by the combined clamping force and mechanical lock formed by the clamping screws passing through both the U-shaped bar 17 and bar 18.

Having now described my invention, what I claim is:

1. A belt coupling means for use in connecting the ends of a longitudinally reinforced belt and transmitting longitudinal loads comprising a first abutment means secured to the reinforcement of one end of the belt, a second abutment means secured to the reinforcement of another belt end and shaped so that the said second abutment means engages and interlocks with the first abutment means, and clamping means for maintaining the abutment means in engagement whereby the first and second abutment means connects the ends of the belt and longitudinal forces are carried entirely by the said interlocked abutment means and not by the clamping means.

2. A belt coupling means according to claim 1 wherein said reinforcement is in the form of a wire.

3. A belt coupling means according to claim 1 wherein the first and second abutment means each comprise a series of collar members for attachment to the reinforcement of the belt ends.

4. A belt coupling means according to claim 3 wherein the collar members are swaged onto the longitudinal reinforcement of the belt ends.

5. A belt coupling means according to claim 3 wherein the collar members are adapted to be retained upon the longitudinal reinforcement of the belt ends by means of nipples swaged onto said longitudinal reinforcement.

6. A belt coupling means according to claim 5 wherein the collar members are recessed to accommodate the nipples.

7. A belt coupling means according to claim 3 wherein the two series of collar members are arranged to intermesh so that the collars attached to one belt end fall between the collars attached to the other belt end.

8. A belt coupling means according to claim 3 wherein the engagement of the abutment means is maintained by means of interlocking surface formations on the abutment means.

9. A belt coupling means according to claim 8 wherein the interlocking surface formations are "V" shaped when viewed in a vertical plane.

* * * * *